United States Patent Office 3,740,413
Patented June 19, 1973

3,740,413
2-BENZIMIDAZOLECARBOXAMIDES
Ronald J. McCaully, Malvern, and Carl Gochman, Philadelphia, Pa., assignors to American Home Products Corporation, New York, N.Y.
No Drawing. Original application May 15, 1970, Ser. No. 37,909, now Patent No. 3,661,925, dated May 9, 1972. Divided and this application Oct. 26, 1971, Ser. No. 192,352
Int. Cl. C07d 49/38
U.S. Cl. 260—309.2          5 Claims

ABSTRACT OF THE DISCLOSURE

This invention relates to substituted 2-benzimidazolecarboxamides and to processes for their production comprising the reaction of a 2,2-dihydroxyacetamide dialkanoate in a solution of o-phenylenediamine. The compounds are pharmacologically active as central nervous system depressant agents.

---

This application is a division of application Ser. No. 37,909 filed May 15, 1970, now U.S. 3,661,925 issued May 9, 1972.

The benzimidazolecarboxamides of the invention are prepared by heating a 2,2-dihydroxyacetamide dialkanoate with a solution of a o-phenylenediamine in an acidic solvent.

DESCRIPTION OF THE INVENTION

The processes of the invention are useful for preparing compounds of Formulas I and II:

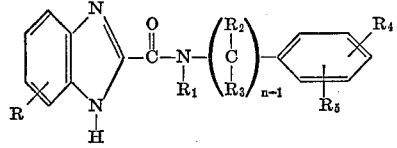

Formula I wherein R is selected from the group consisting of hydrogen, (lower)alkoxy, (lower)alkyl, phenyl, halogen, nitro, trifluoromethyl and sulfamyl.

$R_1$ is selected from the group consisting of hydrogen, (lower)alkyl and phenyl.

$R_2$ and $R_3$ are selected from the group consisting of hydrogen, (lower)alkyl and phenyl.

$n$ is an integer of 1 to about 6.

$R_4$ and $R_5$ are selected from the group consisting of hydrogen, halogen, (lower)alkoxy, sulfamyl and halobenzoyl.

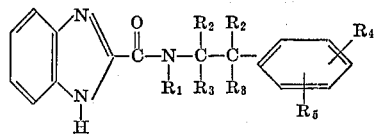

Formula II wherein $R_1$, $R_2$, $R_3$, $R_4$ and $R_5$ are the same as described hereinabove.

The compounds of Formula II are novel as are the following compounds:

2′,6′-dichloro-2-benzimidazolecarboxanilide;
4′-chloro-2′-(o-chlorobenzoyl)-2-benzimidazolecarboxanilide;
N-(3,4-dimethoxybenzyl)-2-benzimidazolecarboxamide;
4′-chloro-2-benzimidazolecarboxanilide;
N-(p-chloro-α,α-dimethylphenethyl)-2-benzimidazolecarboxamide;
5′-chloro-2′-sulfamoyl-2-benzimidazolecarboxanilide.

When used herein and in the appended claims, the term "(lower)alkyl" contemplates hydrocarbon radicals, straight and branched, of from about 1 to about 6 carbon atoms; illustrative members of the group being methyl, ethyl n-propyl, i-propyl, n-butyl, t-butyl, n-pentyl, n-hexyl and the like. The term "(lower)alkoxy" contemplates hydrocarbonoxy groups of from about 1 to about 6 carbon atoms, straight chain and branched, and includes methoxy, ethoxy, n-propoxy, i-propoxy, n-butoxy, t-butoxy, n-pentoxy, n-hexyloxy and the like. By the term "halo" is meant to include: fluoro, chloro, bromo, and iodo.

Compounds of Formula I are pharmacologically active in standard tests as central nervous system depressants and are of value to induce a calming effect in animals.

The 2-benzimidazolecarboxamides of the invention are prepared by heating a solution of a 2,2-dihydroxyacetamide, dialkanoate with a solution of o-phenylenediamine in an acidic solvent. Surprisingly the amino groups of the o-phenylenediamine become attached to the α-carbon of the acetamide moiety with loss of both alkanoyloxy groups. Thereafter, the cyclic intermediate is oxidized to form a benzimidazole of the present invention. The compounds are prepared by the following reaction:

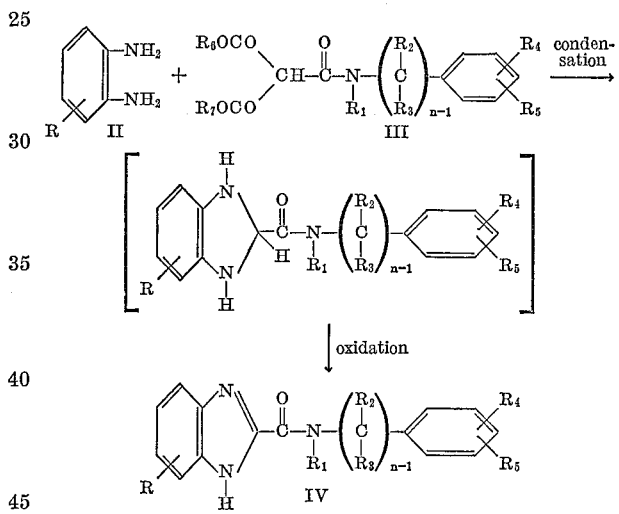

wherein $R_6$ may be hydrogen or (lower)alkyl and $R_7$ is (lower)alkyl, R, $R_1$, $R_2$, $R_3$, $R_4$, $R_5$, and $n$ are the same as defined above.

The above process is usually carried out by admixing a solution of the 2,2-dihydroxyacetamide, dialkanoate with a solution of an appropriate o-phenylenediamine and then heating the mixture within the temperature range of 25–150° C., until the reaction is complete. The optimum temperature is 60° C. Solvents useful for the reaction may be any polar, acidic, non-reactive solvent, which dissolves the reactants. In this regard, any inert solvent, rendered acidic by the addition of strong mineral acid, that is capable of dissolving the reactants may be used. Particularly valuable solvents are glacial acetic acid and trifluoroacetic acid.

Two methods are useful for the isolation of the products. When the prepared 2-benzimidazolecarboxamide is insoluble in the reaction medium, it is convenient to isolate the product by filtration. However, if the product is soluble in the water miscible reaction medium, the 2-benzimidazolecarboxamide may be isolated by pouring the reaction solution onto ice and filtering the resultant solid. The 2-benzimidazolecarboxamides are white to light yellow, high melting, crystalline solids that may be purified by recrystallization from ethanol, 2-methoxyethanol or aqueous alkanolic solutions.

The starting materials of Formula II are commercially available or may be prepared by techniques well known to those skilled in the art. Compounds of Formula III may be prepared by contacting a α,α-dialkanoyloxyacetylhalide with an appropriate amine according to the following reaction:

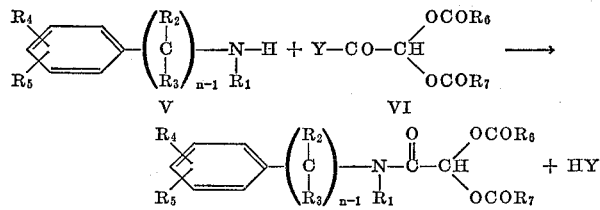

$R_1$, $R_2$, $R_3$, $R_4$, $R_5$, $R_6$, $R_7$ and $n$ are as above defined and $y$ is a displaceable group such as halogen, e.g., chloro or bromo or an obvious chemical equivalent thereof. To obtain, for example, α,α-diacetoxyacetyl chloride, glyoxylic acid, monohydrate (64.0 g.) and 480 ml. (ca. 520 g.) of acetic anhydride and 160 ml. of glacial acetic acid are combined and heated on a steam bath for 2 hours. The solvents are removed on a rotary evaporator and the remaining traces of acetic acid and acetic anhydride are removed by codistillation with 100 ml. of toluene. The residue is dissolved in 350 ml. of methylene chloride and treated with 180 ml. (298 g.) of thionyl chloride. The mixture is then heated at gentle reflux for about 20 minutes and evaporated on a rotary evaporator. An additional 100 ml. of methylene chloride is added and re-evaporated to remove traces of volatile reactants. The homologs may be obtained in a similar manner.

In the pharmacological evaluation of the biological activity of the compounds of this invention, the in vivo effects were tested as follows:

The compound was administered orally or intraperitoneally to three mice (14 to 24 grams) at each of the following doses:

400, 127, 40 and 12.7 milligrams per kilogram of host body weight (m.p.k.). The animals were watched for a minimum of two hours during which time signs of general stimulation, (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) were noted.

The compounds of this invention induce central nervous system depressant effects at a dose of 127 to 400 m.p.k. Thus the compounds of the invention, have demonstrated utility as pharmacologically active compounds in experimental and comparative pharmacology and are of value in the treatment of mammals, e.g. mice, rats, etc., who are responsive to treatment with central nervous system depressant agents. Specifically the compounds may be administered for the purpose of inducing a calming effect in mammals.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk sugar, calcium carbonate and the like. They may be administered orally in the form of solutions which may contain coloring and flavoring agents or they may be administered by parenteral injection, e.g., intramuscular injection. The injectable solution may contain other solutes such as sodium chloride or glucose in a sufficient quantity to render the solution isotonic.

The dosage of the pharmacological therapeutic agents of the invention will vary with the route of administration and the particular compound chosen. Furthermore, it will vary with the particular subject under treatment. Generally, treatment is initiated with small dosages substantially less than the optimum dose of the compound. Thereafter, the dosage may be increased by small increments until the optimum effect under the circumstances is reached.

DESCRIPTION OF THE PREFERRED EMBODIMENTS

Example 1

2′,6′-dichloro - 2 - benzimidazolecarboxanilide.—To a stirred refluxing solution of 4.86 g. of α,α-diacetoxyacetyl chloride in 75 ml. of methylene chloride is added a solution of 8.10 g. of 2,6-dichloroaniline in 40 ml. of methylene chloride. Addition of the amine is stopped after half of the solution is added and an additional 4.86 g. of 2,2-diacetoxyacetyl chloride is added in one portion to the reaction vessel. The remainder of the 2,6-dichloroaniline solution is added rapidly so that the total addition time is approximately 30 minutes. After 4 hours reaction time, the solvent is evaporated in vacuo and the residual oil is dissolved in 100 ml. of EtOH, warmed and diluted with 200 ml. of water. Filtration of the colorless crystals yields 12.41 g. of 2′,6′-dichloro-2,2-dihydroxyacetanilide, diacetate M.P. 103–105° C.

A solution of 3.24 g. (30.0 mmole) of o-phenylenediamine in 60 ml. of glacial acetic acid is added to a solution of 9.2 g. (28.8 mole) of 2′,6′-dichloro-2,2-dihydroxyacetanilide, diacetate in 60 ml. of glacial acetic acid. The solution is stirred on an oil bath (60° C.) in an open flask for five hours. The solution is then poured onto 600 g. of cracked ice with stirring and stirred for 30 minutes. Filtration of the light brown solid that separates yields 4.3 g. of the crude product, M.P. 215–220° C. Recrystallization of the crude product from ethanol yields 1.8 g. of 2′,6′-dichloro-2-benzimidazolecarboxanilide as light brown crystals, M.P. 250–252° C.

Example 2

2′,6′-dichloro-2-benzimidazolecarboxanilide.—A solution of 1.6 g. of 2′,6′-dichloro-2,2-dihydroxyacetanilide, diacetate, prepared according to Example 1, and 10 ml. of trifluoroacetic acid are combined with a solution 0.54 g. of o-phenylenediamine in 10 ml. of trifluoroacetic acid. The combined reaction solution is stirred and heated at 60° C. for 4 hours. Evaporation of the solvent left a dark residue. A solution of the residue in 67% aqueous ethanol is neutralized with aqueous bicarbonate solution, and on standing 0.5 g. of light tan solid separates. The infrared spectrum of the product is the same as the spectrum obtained for 2′,6′-dichloro-2-benzimidazolecarboxanilide in Example 1. In a similar manner the following compounds are prepared:

2′,4′-dibromo-2-benzimidazolecarboxanilide
2′,6′-diiodo-2-benzimidazolecarboxanilide Example 3

4′-chloro-2′-(o - chlorobenzoyl) - 2-benzimidazolecarboxanilide.—Glyoxylic acid monohydrate (8.0 g., 0.087 mmole) in 20 ml. of glacial acetic acid was heated for 1.5 hours with 60 ml. of acetic anhydride on a steam bath. The solvents were evaporated on the rotary evaporator and remaining traces of solvent were removed by codistillation with toluene. The oily residue dissolved in 40 ml. of methylene chloride was treated with 20 ml. of thionyl chloride and the solution was heated at reflux for 20 min. Solvent and excess reagent were removed on a rotary evaporator. The oily residue in 200 ml. of methylene chloride was stirred at gentle reflux and treated dropwise with a solution of 10.4 g. of 2-amino-2′,5-dichloro-benzophenone in 60 ml. of methylene chloride. The solution was refluxed for 15 min. after the addition of the amine was completed. Evaporation of the solvent on a rotary evaporator gave a light amber oil which crystallized spontaneously upon addition of 60 ml. of ethanol. Filtration of the crystals afforded 14.2 g. (85%) of 4'-chloro-2'-(o-chlorobenzoyl)-2,2-dihydroxyacetanilide, diacetate, M.P. 157–160°.

A solution of 3.18 of 4'-chloro-2'-(o-chlorobenzoyl)-2,2-dihydroxyacetanilide, diacetate in 15 ml. of glacial acetic acid is combined with a solution of 0.811 g. of o-phenylenediamine in 15 ml. of glacial acetic acid. The solution is stirred and heated on an oil bath (60° C.) for 5 hours. The crystalline solid that separates is filtered and washed with a small amount of cold acetic acid. The buff colored solid (0.4 g., M.P. 312–315° C.) is recrystallized from 15 ml. of 2-methoxyethanol to yield 0.2 g. of 4'-chloro-2'-(o-chlorobenzoyl)-2-benzimidazolecarboxanilide, M.P. 314–316° C. In a similar manner the following are prepared:

4'-bromo-2'-(o-bromobenzoyl)-2-benzimidazolecarboxanilide
5-phenyl-3'-fluoro-2'-(o-iodobenzoyl)-2-benzimidazolecarboxanilide
4-chloro-4'-bromo-2'-(o-chlorobenzoyl)-2-benzimidazolecarboxanilide.

Example 4

N-(3,4 - dimethoxybenzyl)-2 - benzimidazolecarboxamide.—To a stirred solution of 30 g. of α,α-diacetoxyacetyl chloride in 200 ml. of methylene chloride at 5° C. is added over 2 hours a solution of 25 g. of veratryl amine, and 15 g. of triethylamine in 250 ml. of methylene chloride. After the addition is complete the mixture is stirred for one hour at 5° C. and allowed to warm to room temperature. The mixture is then poured into water and the methylene chloride layer is separated. The methylene chloride is washed with three portions of water and dried (MgSO$_4$). Evaporation of the solvent yields an oil that crystallizes on treatment with 120 ml. of hot ethanol. The preparation yields 27.4 g. (56%) of N-(3,4-dimethoxybenzyl)-2,2-dihydroxyacetamide, diacetate, M.P. 121–123° C. A solution of 2.16 g. of o-phenylenediamine in 30 ml. of warm glacial acetic acid is added to a solution to 6.50 g. of N-(3,4-dimethoxybenzyl)-2,2-dihydroxyacetamide, diacetate in 30 ml. of glacial acetic acid. The resultant solution is heated with stirring on an oil bath (60°) for 5 hours and poured with stirring into 200 g. of cracked ice. Filtration of the brown solid (2.8 g., M.P. 128–133°) that separates and subsequent recrystallization yields 1.1 g. of N-(3,4-dimethoxybenzyl)-2 - benzimidazolecarboxamide, M.P. 170–172° C. In a similar manner the following are prepared:

N-(4-methoxybenzyl)-2-benzimidazolecarboxamide
N-(4-propoxybenzyl)-2-benzimidazolecarboxamide
N-(3,5-diethoxybenzyl)-2-benzimidazolecarboxamide
N-(4-butoxyphenethyl)-2-benzimidazolecarboxamide
N-(3-sulfamyl-α-phenylphenethyl)-2-benzimidazolecarboxamide
N-(3-pentoxy-α-ethylphenylpropyl)-2-benzimidazolecarboxamide.

Example 5

4'-chloro-2-benzimidazolecarboxanilide.—To a stirred, refluxing solution of 9.75 g. (0.05 mole) of 2,2-diacetoxyacetyl chloride in 100 ml. of methylene chloride is added (over 15 minutes a solution of 6.37 g. (0.05 mole) of p-chloroaniline in 40 ml. of methylene chloride. The mixture is refluxed for an additional 15 minutes and chilled in an ice bath. The hydrochloride salt that separates is filtered, and the filtrate is evaporated to an oil. An ether solution of the oil is washed successively with water, dilute sodium bicarbonate solution, and saturated salt solution and dried (MgSO$_4$). Evaporation of the ether yields an oil that crystallizes spontaneously. The crude solid (M.P. 95–100°) is recrystallized by dissolving in 60 ml. of 2-methoxyethanol and diluting the solution with 30 ml. of water. Filtration of the crystals yields 6.92 g. of 4'-chloro-2,2-dihydroxyacetanilide, diacetate, M.P. 105–107° C. A solution of 2.16 g. of o-phenylenediamine in 30 ml. of glacial acetic acid is added to a solution of 5.6 g. of 4'-chloro-2,2-dihydroxyacetanilide, diacetate in 30 ml. of glacial acetic acid. The combined solution is stirred at 60° C. for 5 hours, during which time a solid separates spontaneously. Filtration of the solid yields 1.7 g. of crude material, M.P. 250–252° C. Recrystallization from absolute ethanol yields pure 4'-chloro-2-benzimidazolecarboxanilide, M.P. 252–253° C.

In a similar manner the following are prepared:

4'-bromo-2-benzimidazolecarboxanilide
3'-iodo-2-benzimidazolecarboxanilide
2'-fluoro-2-benzimidazolecarboxanilide
4'-sulfamyl-2-benzimidazolecarboxanilide
5-nitro-2-benzimidazolecarboxanilide
4-trifluoromethyl-2-benzimidazolecarboxanilide
5-methyl-2-benzimidazolecarboxanilide
4-ethyl-2-benzimidazolecarboxanilide
4-propyl-2-benzimidazolecarboxanilide
5-isopropyl-2-benzimidazolecarboxanilide
4-pentyl-4'-chloro-2-benzimidazolecarboxanilide
4-methoxy-2-benzimidazolecarboxanilide
5-ethoxy-2-benzimidazolecarboxanilide
4-propoxy-2-benzimidazolecarboxanilide Example 6

N-(p-chloro - α,α - dimethylphenethyl) - 2 - benzimidazolecarbarboxamide.—To a solution of 18.3 g. (0.10 mole), p-chloro-α,α-dimethylphenethylamine and 10.1 g. (0.10 ml.) of triethylamine in 150 ml. methylene chloride is added dropwise with stirring to a cold, magnetically stirred solution of 20.4 g. of α,α-diacetoxyacetyl chloride in 150 ml. of methylene chloride. After the addition is complete (30 minutes) the solution is stirred for one hour on the ice bath. The reaction mixture is washed successfully with 250 ml. of 10% hydrochloric acid, 250 ml. of 10% sodium bicarbonate solution and water. The methylene chloride is dried over magnesium sulfate and evaporated in vacuo. The oily residue is crystallized in 80% aqueous ethanol and recrystallized from the same solvent to give 19.6 g. of N-(p-chloro-α,α-dimethylphenethyl-2,2-dihydroxyacetamide, diacetate. A solution of 6.84 g. (0.02 mole) of N-(p-chloro-α,α-dimethylphenethyl)-2,2-dihydroxyacetamide, diacetate in 30 ml. of glacial acetic acid is combined with 2.16 g. (0.02 mole) of o-phenylenediamine in 30 ml. of glacial acetic acid, and the resultant solution is stirred for 18 hours at 60° C. After the solution has cooled to room temperature, it is poured into 200 g. of cracked ice. The mixture is stirred for one hour until all of the solid becomes granular. The crude solid is filtered and recrystallized from ethanol to afford 1.6 g. of N-(p-chloro-α,α-dimethylphenethyl) - 2 - benzimidazolecarboxamide as a light tan solid, M.P. 210–212° C. In a similar manner the following are prepared:

N-(p-bromo-α,α-dimethylphenpentyl)-2-benzimidizolecarboxamide
N-(p-fluoro-α-methylphenpropyl)-5-chloro-2-benzimidazolecarboxamide
N-methyl-N-(α-propylphenyl)-2-benzimidazolecarboxamide
N-ethyl,N-(α,α-diethylphenethyl)-2-benzimidazolecarboxamide
N-phenyl,N-(p-chloro-α,α-dimethylphenethyl)-2-benziamidozolecarboxamide
N-propyl,N(-α-mehylphenbutyl)-4-trifluoromethyl-2-benzimidazolecarboxamide.

Example 7

5' - chloro-2'-sulfamyl-2-benzimidazolecarboxanilide.—2,2-diacetoxyacetyl chloride (21.5 g., 0.111 mole) in 75 ml. of p-dioxane is added to a slurry of 20.7 g. (0.100 mole) of 2-amino-4-chlorobenzenesulfonamide in 125 ml. of p-dioxane. The stirred mixture is heated at reflux under a nitrogen atmosphere for 16 hours. The warm solution is then filtered and concentrated in vacuo to an amber oil. The residue is dissolved in 75 ml. of ethanol and is diluted with 75 ml. of water and is seeded to induce crystallization. Filtration of the crystals gives 20.31 g. of 5'-chloro-2,2-dihydroxy-2'-sulfamylacetanilide, diacetate M.P. 148–150° C. A solution of 3.24 g. (0.03 mole) of o-phenylenediamine in 30 ml. of glacial acetic acid is added (via a hypodermic needle through a rubber septum) to a stirred solution of 7.3 g. (0.02 mole) of 5'-chloro-2,2-dihydroxy-2'-sulfamylacetanide, diacetate under a nitrogen atmosphere. The reaction solution is stirred at 60° C. for 5 hours and the solid that separates is filtered and washed with glacial acetic acid. The solid is heated for 10 minutes in 10 ml. of 80% aqueous ethanol, chilled and filtered, affording 1.2 g. of 5'-chloro-2'-sulfamyl-2-benzimidazolecarboxanilide, M.P. 287–289° C.

Example 8

5' - chloro-2'-sulfamyl-2-benzimidazolecarboxanilide.—This compound is prepared according to the procedure described in Example 7 except that 2,2-acetoxyacetyl chloride, dipropionate is substituted for the 2,2-diacetoxyacetyl chloride employed therein. In a similar manner the following compounds are substituted for the 2,2-diacetoxyacetyl chloride of Example 7.

2,2-dihydroxyacetyl chloride, dibutanoate
2,2-dihydroxyacetyl chloride, diformate
2,2-dihydroxyacetyl, bromide, formate, acetate.

We claim:
1. A compound selected from the group consisting of 4'-chloro-2'-(-chlorobenzoyl)-2-benzimidazole-carboxanilide,
N-(3,4-dimethoxybenzyl)-2-benzimidazolecarboxamide,
N-(p-chloro-α,α-dimethylphenethyl)-2-benzimidazolecarboxamide, and
5'-chloro-2'-sulfamyl-2-benzimidazolecarboxanilide.
2. 4' - chloro-2'-(o-chlorobenzoyl)-2-benzimidazolecarboxanilide.
3. N - (3,4 - dimethoxybenzyl) - 2 - benzimidazolecarboxamide.
4. N-(p-chloro - α,α - dimethylphenethyl)-2-benzimidazolecarboxamide.
5. 5' - chloro-2'sulfamyl-2-benzimidazolecarboxanilide.

References Cited

UNITED STATES PATENTS 3,475,447  10/1969  Samuel _____ 260—309.2

FOREIGN PATENTS 1,517,719  2/1968  France _____ 260—309.2

OTHER REFERENCES

Copeland et al., J. Amer. Soc., vol. 65, pp. 1072–75 (1943). QD1.A5.

Gompper et al., Chem. Ber., vol. 92, pp. 550–63 (1959). QD1.D4.

Gomppers et al., Chem. Abst., vol. 53, columns 13139–42 (1959). QD1.A51.

Holan et al., J. Chem. Soc. (London), 1967, C, pp. 25–29. QD1.C6aC.

NATALIE TROUSOF, Primary Examiner

U.S. Cl. X.R.

260—490, 494, 544 Y; 424—273